United States Patent [19]

Carswell et al.

[11] Patent Number: 5,326,631
[45] Date of Patent: Jul. 5, 1994

[54] UNSINTERED FIBER BURNER MADE WITH METAL FIBERS, CERAMIC FIBERS AND BINDING AGENT

[75] Inventors: Martin G. Carswell, San Jose; Robert M. Kendall, Sunnyvale; John D. Sullivan, Fremont, all of Calif.

[73] Assignee: Alzeta Corporation, Santa Clara, Calif.

[21] Appl. No.: 71,973

[22] Filed: Jun. 7, 1993

[51] Int. Cl.⁵ .................. F23D 14/12; B05D 5/00
[52] U.S. Cl. .................... 428/256; 428/255; 428/224; 428/288; 428/289; 428/296; 428/297; 428/304.4; 428/307.3; 428/211.1; 428/317.9; 428/319.1; 162/121; 162/178; 162/129; 501/48; 501/94
[58] Field of Search ............ 431/328, 326, 7; 428/224, 288, 255, 256, 289, 296, 297, 304.4, 307.3, 311.1, 317.9, 319.1; 62/129, 128, 127; 501/48, 94

[56] References Cited

U.S. PATENT DOCUMENTS 4,597,734  7/1986  McCausland et al. .............. 431/328
5,205,731  4/1993  Reuter et al. ........................ 431/328

Primary Examiner—Patrick J. Ryan
Assistant Examiner—Richard C. Weisberger
Attorney, Agent, or Firm—Paul W. Garbo

[57] ABSTRACT

An unsintered metal fiber burner is produced by mixing ceramic fibers with the metal fibers and binding the mixed metal-ceramic fibers together as a porous layer adherent to a foraminous support. By mixing ceramic fibers with metal fibers, the cost of a sintered metal fiber burner is reduced while the novel burner, because of the metal fiber therein, exhibits improved properties such as greater radiant efficiency, lower $NO_x$ emissions and increased durability.

12 Claims, No Drawings

UNSINTERED FIBER BURNER MADE WITH METAL FIBERS, CERAMIC FIBERS AND BINDING AGENT

BACKGROUND OF THE INVENTION

This invention relates to porous fiber burners made with metal fibers without sintering. More particularly, the invention combines ceramic fibers with metal fibers and binds the mixed fibers using the technique and binding agents that are used in the production of ceramic fiber burners. The novel mixed fiber burners of this invention have improved radiant efficiency and lowered emissions of nitrogen oxides ($NO_x$).

Two types of porous fiber burners have been developed and are available in commerce. Sintered metal fiber burners are described in U.S. Pat. No. 4,597,734 (McCausland et al) and European Patent Application (Publication No. 0 390 255). Ceramic fiber burners have been disclosed in many patents including U.S. Pat. Nos. 3,179,156 (Weiss et al), 3,383,159 (Smith) and 4,746,287 (Lannutti).

Sintered metal fiber burners are more expensive than ceramic fiber burners and this cost difference limits their use. Moreover, the aforesaid European Patent Application discloses that large temperature fluctuations can lead to the formation of cracks or craters in the combustion surface of metal fiber burners.

The basic ceramic fiber burner as early developed by Weiss et al required improvement and the Smith and Lannutti patents contributed additives that yield definite improvement. However, the sintered metal fiber burner has better emissivity than the Weiss et al burner even as improved by Smith or Lannutti.

Accordingly, a principal object of this invention is to provide a porous fiber burner that reduces the cost of a metal fiber burner while substantially eliminating its tendency to crack and form craters.

Another important object is to provide a burner of mixed metal and ceramic fibers by utilizing the highly developed technology and existing facilities for producing ceramic fiber burners.

Other features and advantages of the invention will be apparent from the description which follows.

SUMMARY OF THE INVENTION

In accordance with this invention, metal and ceramic fibers are suspended in water containing both dissolved and suspended agents commonly used in the manufacture of porous ceramic fiber burners. These agents include a binding or cementing material such as a dispersion of colloidal alumina, and a pore-forming removable filler such as fine particles of methyl methacrylate. Frequently, a powdered metal such as that taught by Smith or Lannutti is added to the suspension.

The aqueous suspension of mixed metal and ceramic fibers containing at least a binder and a pore former is used to form the burner by vacuum molding on a foraminous metal sheet. The vacuum molding procedure has been amply described in the prior art and thus requires no elaboration herein. This is also true of the subsequent steps of drying the wet mixed fiber layer deposited on the foraminous support and removing the pore-forming filler, most commonly achieved by high-temperature treatment to effect vaporization and burning of a filler such as methyl methacrylate. A filler such as camphor can be removed by dissolution in an organic solvent.

The resulting porous fiber layer on the porous support is ready for use as a burner.

The metal fibers selected for the novel burner are made of a metal that is resistant to the high temperature and oxidizing conditions to which it will be exposed when placed in service. While the selected metal fiber may undergo surface oxidation, it must be resistant to progressive oxidation which would lead to disintegration or pulverization of the fiber.

Iron-based and nickel-based alloys are well suited as fibers in the burner of this invention. Iron-aluminum alloys are frequently favored. Nickel-chromium alloys are another alloy type that can provide fibers with the desired resistance to high temperature and oxidation. Preferred iron-aluminum alloys contain by weight 4% to 10% aluminum, 16% to 24% chromium, 0% to 26% nickel and often fractional percentages of yttrium and silicon. Preferred nickel-chromium alloys contain by weight 15% to 30% chromium, 0% to 5% aluminum, 0% to 8% iron and often fractional percentages of yttrium and silicon. The preferred alloys contain chromium.

The metal fiber diameter is less than about 50 microns and usually in the range of about 8 to 25 microns while the fiber length is in the range of about 0.1 to 3 millimeters. The metal fibers may be straight or curled.

The ceramic fiber most commonly used is formed of alumina and silica and is commercially available under the trademark Fiberfrax. Another ceramic fiber formed of alumina is sold under the trademark Saffil and is suited for exposure to temperatures exceeding 2300° F., the maximum temperature rating of Fiberfrax fiber.

The proportioning of metal and ceramic fibers is usually varied over the range of 0.2 to 2 weight parts of ceramic fiber per weight part of metal fiber. Inasmuch as the density of metal fibers is more than double the density of ceramic fibers, the percentage of the total volume of mixed fibers contributed by the ceramic fiber varies roughly from 30% to 85% for the aforesaid range of weight proportions. Metal fibers are considerably more expensive than ceramic fibers, particularly such as Fiberfrax fiber. Therefore, for most uses of the novel burner, the weight ratio of ceramic to metal fiber will exceed 1 and be as much as 2 to keep the burner cost down.

As in the case of ceramic fiber burners, the mixed fiber burner has a fiber layer of about 0.25 to 0.50 inch thick, deposited on and adherent to a foraminous support, e.g., a metal screen or a perforated metal sheet. The support can be flat, inwardly or outwardly dished, or tubular.

The benefits of the unsintered fiber burner made with metal fibers, besides lower cost than that of a sintered metal fiber burner, will be best borne out by the illustrative examples of the invention.

DESCRIPTION OF PREFERRED EMBODIMENTS

EXAMPLE 1

To each gallon of the aqueous suspension of binding agent described by Lannutti (column 4, lines 16 to 21), the following materials are added:

| Fiberfrax fiber | 10 grams |
|---|---|
| Aluminum powder | 40 grams |
| Methyl methacrylate | 86 grams |

The burner made with this formulation will be labeled "Standard A" ceramic fiber burner.

The foregoing formulation has 8.9 grams of metal fiber added to each gallon thereof. The metal fiber is an iron-aluminum alloy containing by weight 5.5% aluminum, 22% chromium and less than 0.5% yttrium and silicon. The burner made with this modified formulation will be labeled "New A" metal-ceramic fiber burner.

Both burners were tested by firing with an air-fuel gas premix having 15% excess air at a rate of 100 MBTU/hr ft² (thousand British Thermal Units per hour per square foot). The air-fuel premix was preheated to about 475° F. The burners were surrounded by walls that were at about 1300° F.

Initially, both burners gave essentially the same $NO_x$ emissions (parts per million at 3% oxygen content):

| Standard A burner | 13.5 |
|---|---|
| New A burner | 13.1 |

After 2000 hours of operation:

| Standard A burner | 18.7 |
|---|---|
| New A burner | 16.6 |

Extended use of the Standard A burner impaired its ability to maintain a low level of $NO_x$ emissions more than that of the New A burner.

Both burners were also tested for radiant efficiency:

| Burner | Initially | After 2000 hours |
|---|---|---|
| Standard A | 18.9 | 13.1 |
| New A | 19.0 | 16.9 |

The radiant efficiency of the New A burner was better than that of the Standard A burner after 2000 hours of service. Moreover, by visual examination the Standard A burner showed more degradation than the New A burner did from extended use.

The foregoing comparative testing was repeated with only one change in the formulation of the novel burner, namely, the metal fiber used was an alternate iron-aluminum alloy containing by weight 9% aluminum, 18% chromium, 25% nickel and 0.02% yttrium. The test results were essentially the same as those presented hereinabove.

EXAMPLE 2

To each gallon of the formulation used to produce Standard A ceramic fiber burner, 7.25 grams of the alternate metal fiber used in repeating Example 1 are added. The burner made with this modified formulation will be labeled "New B" metal-ceramic fiber burner.

Combustion tests were conducted to compare Standard A and New B burners. The air-fuel gas mixture, preheated to about 300° F., was fired at a higher rate of 125 MBTU/hr ft² with 15% excess air in these tests. Both burners were surrounded by walls at 1800° F.

Under these severe firing conditions, Standard A burner failed after 1272 hours. Visual examination revealed that the ceramic fiber layer was badly pitted. Firing of New B burner was continued for an additional 400 hours without failure.

EXAMPLE 3

The formulation used to produce Standard A ceramic fiber burner is modified in that Fiberfrax fiber is replaced by Saffil fiber on an equal weight basis and the quantity of methyl methacrylate was reduced by 50%. The burner produced with this formulation will be labeled "Standard B" ceramic fiber burner.

The formulation for Standard B burner is then modified by adding the alternate metal fiber used in repeating Example 1 in the amount of 40 grams per gallon but omitting the aluminum powder. The burner made with this formulation will be labeled "New C" metal-ceramic fiber burner.

Comparing Standard B and New C burners under the firing conditions used in Example 2, it was found that Standard B burner failed within an hour by flashing back through the ceramic fiber layer. It should be noted that flashback occurred in spite of the presence of aluminum powder which under normal firing conditions prevents flashback.

However, New C burner, even without the aluminum powder, performed satisfactorily in a test period of 1675 hours. New C burner clearly demonstrates the high resistance to flashback of the mixed metal-ceramic fiber burner of this invention.

Summarizing the test results of the preceding examples, a metal-ceramic fiber burner (New C) having a preponderance of metal fiber performs well under severe firing conditions even without the benefit of aluminum powder. Conversely, a metal-ceramic burner (New A) with a preponderance of ceramic fiber has better radiant efficiency and lower $NO_x$ emissions than an equivalent burner lacking a small amount of metal fiber. Moreover, a burner (New B) with an added small amount of metal fiber has improved durability even in an unusually high-temperature environment. Lastly, but not least, the mixed metal-ceramic fiber burner of this invention is cheaper than the sintered metal fiber burner.

Those skilled in the art will readily visualize variations and modifications of the invention in light of the foregoing disclosure without departing from the spirit or scope of the invention. The many patents dealing with the technology of porous ceramic fiber burners are certainly suggestive of the many possible variations. Accordingly, only such limitations should be imposed on the invention as are set forth in the appended claims.

What is claimed is:

1. An unsintered fiber burner made with metal fibers mixed with ceramic fibers, said metal fibers being resistant to the high temperature and oxidizing conditions to which said burner will be exposed, the mixed fibers being bonded together as a porous layer adherent to a foraminous support by a binding agent in the aqueous suspension of said mixed fibers used to vacuum mold said unsintered fiber burner.

2. The burner of claim 1 wherein the metal fiber is made of an alloy selected from the group consisting of iron-based and nickel-based alloys, and the weight ratio of the ceramic fiber to said metal fiber is at least 0.2.

3. The burner of claim 1 wherein the metal fiber is made of an iron-aluminum alloy containing by weight 4% to 10% aluminum, 16% to 24% chromium and 0% to 26% nickel, and the weight ratio of the ceramic fiber to said metal fiber is in the range of 0.2 to 2.

4. The burner of claim 1 wherein the metal fiber is made of a nickel-chromium alloy containing by weight 15% to 30% chromium, 0% to 5% aluminum and 0% to 8% iron, and the weight ratio of the ceramic fiber to said metal fiber is in the range of 0.2 to 2.

5. The burner of claim 3 wherein the weight ratio of the ceramic fiber to the metal fiber is at least 1.

6. The burner of claim 4 wherein the weight ratio of the ceramic fiber to the metal fiber is at least 1.

7. In a porous ceramic fiber burner, the improvement which comprises a metal fiber uniformly mixed with the ceramic fiber of said burner, said metal fiber being resistant to the high temperature and oxidizing conditions to which said burner will be exposed, and the weight of said metal fiber being not greater than five times the weight of said ceramic fiber.

8. The burner of claim 7 wherein the metal fiber is made of an alloy selected from the group consisting of iron-based and nickel-based alloys containing chromium.

9. The burner of claim 7 wherein the metal fiber is made of an iron-aluminum alloy containing by weight 4% to 10% aluminum, 16% to 24% chromium and 0% to 26% nickel, and the weight of said metal fiber is at least one half of the weight of the ceramic fiber of said burner.

10. The burner of claim 7 wherein the metal fiber is made of a nickel-chromium alloy containing by weight 15% to 30% chromium, 0% to 5% aluminum and 0% to 8% iron, and the weight of said metal fiber is at least one half of the weight of the ceramic fiber of said burner.

11. The burner of claim 9 wherein the weight of the metal fiber is not greater than the weight of the ceramic fiber of said burner.

12. The burner of claim 10 wherein the weight of the metal fiber is not greater than the weight of the ceramic fiber of said burner.

* * * * *